(12) United States Patent
Rukonic et al.

(10) Patent No.: US 7,840,457 B2
(45) Date of Patent: Nov. 23, 2010

(54) SYSTEM AND METHOD FOR AUTOMATED TRANSACTION SPLITTING

(75) Inventors: Marko Rukonic, San Jose, CA (US); Benjamin R. Weiss, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 131 days.

(21) Appl. No.: 12/053,798

(22) Filed: Mar. 24, 2008

(65) Prior Publication Data

US 2009/0240605 A1 Sep. 24, 2009

(51) Int. Cl.
*G07B 17/00* (2006.01)
*G07F 19/00* (2006.01)

(52) U.S. Cl. ............... 705/30; 705/39; 705/1; 705/36 R; 707/1; 707/999.001

(58) Field of Classification Search ............ 705/30, 705/67, 26, 1, 35, 10, 40, 5, 14, 39, 9; 715/744; 283/115, 66.1, 57; 713/186; 707/1
See application file for complete search history.

(56) References Cited

U.S. PATENT DOCUMENTS

| | | | | |
|---|---|---|---|---|
| 5,882,041 | A * | 3/1999 | Schara | 283/66.1 |
| 6,859,212 | B2 * | 2/2005 | Kumar et al. | 715/744 |
| 7,437,330 | B1 * | 10/2008 | Robinson et al. | 705/67 |
| 2002/0087441 | A1 * | 7/2002 | Wagner et al. | 705/30 |
| 2002/0101626 | A1 * | 8/2002 | Pandipati | 358/505 |
| 2002/0173986 | A1 * | 11/2002 | Lehew et al. | 705/1 |
| 2004/0254881 | A1 * | 12/2004 | Kumar et al. | 705/40 |
| 2006/0101323 | A1 * | 5/2006 | Satyavolu | 715/501.1 |
| 2006/0218088 | A1 * | 9/2006 | Flora et al. | 705/39 |
| 2006/0224558 | A1 * | 10/2006 | Flora et al. | 707/1 |
| 2006/0241962 | A1 * | 10/2006 | Flora et al. | 705/1 |
| 2007/0055597 | A1 * | 3/2007 | Patel et al. | 705/35 |
| 2008/0040222 | A1 * | 2/2008 | Gee | 705/14 |
| 2008/0046382 | A1 * | 2/2008 | Metz | 705/36 R |
| 2009/0150265 | A1 * | 6/2009 | Keld | 705/30 |

(Continued)

OTHER PUBLICATIONS

Alan S. Kay. "Challenging the Finance Software Giants :[Final Edition]." Rev. of: Reilly Technologies' Moneydance 2005. The Washington Post Apr. 17, 2005, Business Dateline, ProQuest. Web. Aug. 4, 2010.*

(Continued)

*Primary Examiner*—Matthew S Gart
*Assistant Examiner*—Olusegun Goyea
(74) *Attorney, Agent, or Firm*—Park, Vaughan, Fleming & Dowler LLP

(57) ABSTRACT

A system and method are provided for automated transaction splitting. A central repository gathers details of multi-category transactions between a first payee (e.g., merchant, investment firm) and one or more users. Each category's proportionate share of the total of the transactions is calculated and used to configure an average or model transaction. When a new transaction is received, it is automatically split among the categories based on the model transaction. Multiple types or tiers of model transactions may be applied. For example, a user-specific model transaction may reflect one specific user's history of transactions with the payee. A community model transaction may reflect multiple users' transactions. Similarly, one type of model transaction may reflect transactions with a single payee, while another type may reflect transactions with related payees (e.g., payees having similar businesses).

12 Claims, 4 Drawing Sheets

U.S. PATENT DOCUMENTS

2009/0172021 A1* 7/2009 Kane et al. ............... 707/104.1
2009/0240605 A1* 9/2009 Rukonic et al. ............... 705/30

OTHER PUBLICATIONS

Ketron, Holly, Misra, Prashanta, and Goodman, Jordan E. "Software that gives your finances wings." Money Aug. 1, 1993: ABI/Inform Global, ProQuest. Web. Aug. 4, 2010.*

"MoneyCounts 7.0 Personal Edition." Rev. of: Parsons Technology's MoneyCounts 7.0 Personal Edition, Personal finance Software. Compute Apr. 1, 1993: ProQuest Computing, ProQuest. Web. Aug. 4, 2010.*

Money Magazine.. "On-Line Finance Picking the Right Software for Money Management :[North Sports Final Edition]." Chicago Tribune (pre-1997 Fulltext) Sep. 10, 1993,Chicago Tribune, ProQuest. Web. Aug. 4, 2010.*

Kichen, Steve. "Desktop Finance." Forbes Jun. 22, 1992: ABI/Inform Global, ProQuest. Web. Aug. 4, 2010.*

* cited by examiner

User Table 210

| User | Payee | Category | Split |
|------|-------|----------|-------|
| A | Payee1 | Clothing | 1 |

| User | Payee | Category | Split |
|------|-------|----------|-------|
| A | Payee1 | Clothing | .74 |
| A | Payee1 | Groceries | .26 |

| User | Payee | Category | Split |
|------|-------|----------|-------|
| A | Payee1 | Clothing | .74 |
| A | Payee1 | Groceries | .26 |
| B | Payee1 | Clothing | .42 |
| B | Payee1 | Groceries | .58 |

| User | Payee | Category | Split |
|------|-------|----------|-------|
| A | Payee1 | Clothing | .74 |
| A | Payee1 | Groceries | .26 |
| B | Payee1 | Clothing | .42 |
| B | Payee1 | Groceries | .58 |
| D | Payee1 | Clothing | .19 |
| D | Payee1 | Household | .81 |

Time: T1, T2, T3, T4

Community Table 230

| Payee | Category | Split |
|-------|----------|-------|
| Payee1 | Clothing | 1 |

| Payee | Category | Split |
|-------|----------|-------|
| Payee1 | Clothing | .74 |
| Payee1 | Groceries | .26 |

| Payee | Category | Split |
|-------|----------|-------|
| Payee1 | Clothing | .56 |
| Payee1 | Groceries | .44 |

| Payee | Category | Split |
|-------|----------|-------|
| Payee1 | Clothing | .45 |
| Payee1 | Groceries | .28 |
| Payee1 | Household | .27 |

User Table 210     Time     Community Table 230

| User | Payee | Category | Split |
|---|---|---|---|
| A | Payee1 | Clothing | .74 |
| A | Payee1 | Groceries | .26 |
| B | Payee1 | Clothing | .42 |
| B | Payee1 | Groceries | .58 |
| D | Payee1 | Clothing | .19 |
| D | Payee1 | Household | .81 |
| E | Payee1 | Rent | 1 |

T5

| Payee | Category | Split |
|---|---|---|
| Payee1 | Clothing | .45 |
| Payee1 | Groceries | .28 |
| Payee1 | Household | .27 |
| Payee1 | Rent | 1 |

SYSTEM AND METHOD FOR AUTOMATED TRANSACTION SPLITTING

RELATED APPLICATION

This application is related to U.S. patent application Ser. No. 11/833,206, filed Aug. 2, 2007 and entitled "Method and System for Automatic Recognition and Categorization of Transactions," which is incorporated herein by reference.

BACKGROUND

This invention relates to the field of computer systems. More particularly, a system and methods are provided for automated splitting of a financial transaction into multiple categories.

Financial transactions (e.g., purchases, investments) often involve single payments for multiple items or purposes. For example, at a retail store a customer may engage in a single transaction for an array of goods. Or, an investor may make a single disbursement to a brokerage for investments in multiple stocks or funds.

People who track their financial activity (e.g., with accounting or other financial management software) often wish to categorize their transactions in order to track their expenses, help plan or adhere to a budget, or for some other purpose. However, their software may not support split transactions or, if split transactions are possible, may make it difficult or time-consuming to record a split transaction.

Splitting a transaction involves splitting the total value or amount of the transaction among multiple categories, wherein the portion of the transaction assigned to each category characterizes the purpose or goal of that portion of the transaction. Thus, the illustrative retail transaction mentioned above could be split among the categories of goods the customer purchased (e.g., electronics, clothing, household goods).

With many financial management software programs, to split a transaction a user may be required to manually identify every category involved in a transaction and separately enter or configure each category's portion of the transaction. Each user must start afresh, even if his or her buying pattern matches a pattern exhibited by multiple other users.

Some financial management programs are capable of downloading transaction data from a credit card issuer, an investment firm or other repository of transaction details, thereby alleviating a user of some effort. However, these programs typically do not have access to line-item data that describes or characterizes every individual purchase or element of a transaction. Therefore, in these programs transactions are still often recorded under a single category. That single category may indeed be correct for a portion of the transaction, but may mischaracterize other portions. Thus, a single entry for a shopping trip to a large retailer may be categorized under "clothing" even though some or even most of the purchases were not related to clothing.

SUMMARY

In one embodiment of the invention, a system and methods are provided for automatically splitting a financial transaction among multiple categories. In this embodiment, the manner in which the total value of a transaction with a given payee (e.g., merchant, investment firm) is automatically divided among the categories is based on an "average" or "model" transaction.

In some embodiments of the invention, a number of past multi-category transactions for a given payee are analyzed to determine how they were split among a plurality of categories. For example, from the total value of the past transactions, each category's percentage of that total may be calculated. The model transaction can then be configured to reflect those categories and their observed percentages, and a new transaction can be automatically split based on that model transaction.

In some embodiments, either or both "user-specific" and "community" model transactions may be defined for a payee. User-specific model transactions reflect a specific user's past transactions with the payee, while a community model transaction reflects a set of users' aggregated patterns of transactions.

When a new transaction with a payee is identified for automatic splitting, a model transaction may be applied to yield a tentative split. For example, if the participating user has split one or more transactions with the payee in the past, his or her user-specific model transaction may be applied. Alternatively, if the user has never before split a transaction with the payee, then a community model transaction may be applied. The tentative split may then be adjusted if desired.

In some embodiments of the invention, different average or model transactions may be applied in different circumstances. For example, selection of a model transaction for generating a tentative automatic split may be based on the total amount of the new transaction. As thresholds of value are exceeded, different default model transactions are applied. Similarly, different model transactions (especially different community model transactions) may be applied in different geographic areas, at different times of the year, for users in different demographic groups, etc.

When a tentative automatic split is presented to a user (e.g., for recordation in a financial management program), the user may choose to amend the split. In different implementations, this may or may not cause a user-specific or community model transaction to be adjusted as well.

DESCRIPTION OF THE FIGURES

FIGS. 2A-B depict data structures that may be used to construct user-specific and/or community model transactions, according to an embodiment of the invention.

DETAILED DESCRIPTION

Figure 1:
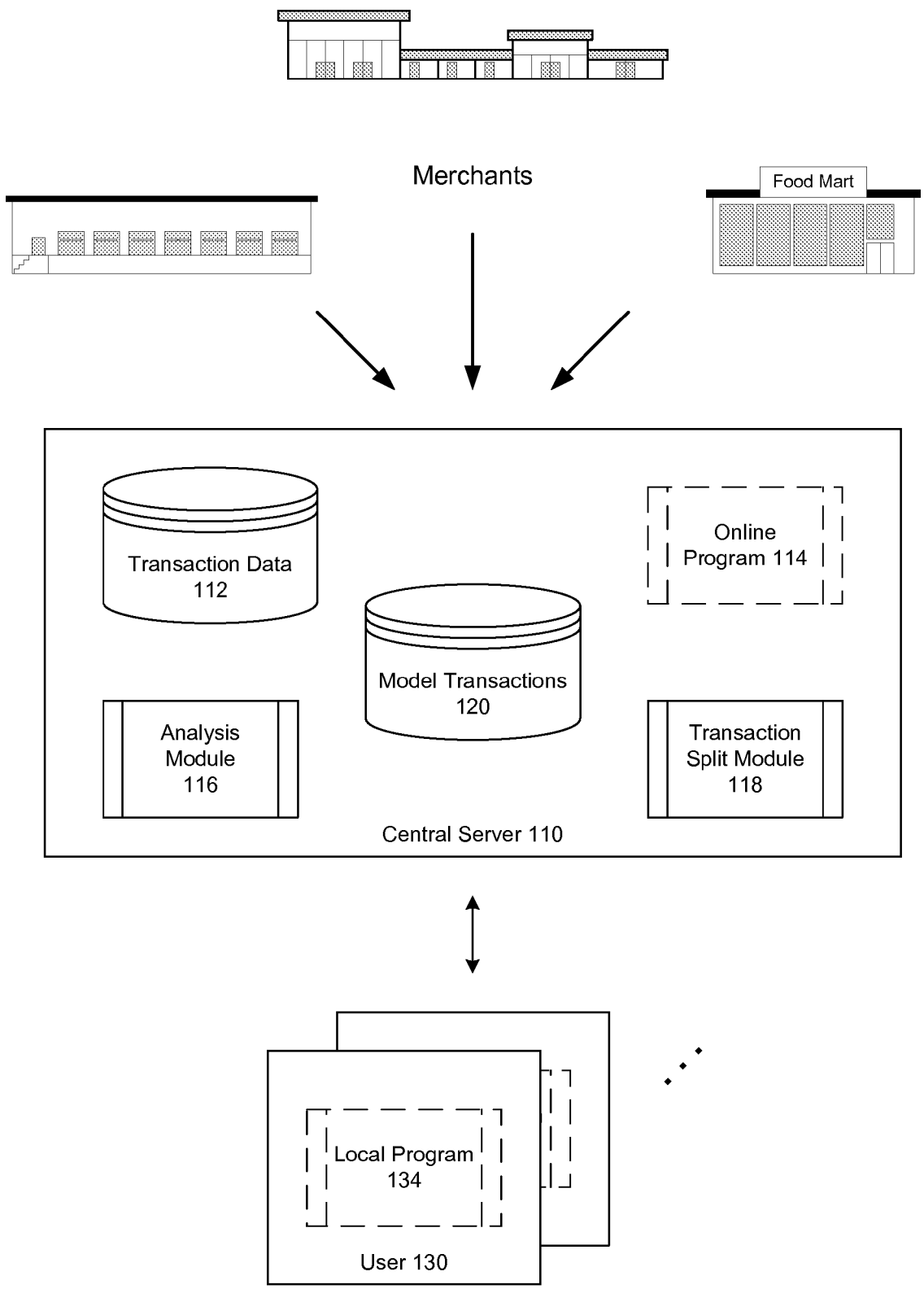
FIG. 1 is a block diagram depicting an environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and methods are provided for automatically splitting a user's financial transaction with a payee among multiple categories. The manner in which the transaction is split may be derived from the user's past transactions and/or transactions of other users. The user may be able to fine-tune the transaction splitting.

The splitting and recording of users' transactions is performed in conjunction with the operation of a financial management program that may be used for budgeting, recording expenses, managing accounts and/or investments, calculating taxes, etc. The program that includes or operates in conjunction with an embodiment of the invention may be an online program hosted by a central server, or include some combination of stand-alone and online functionality. Alternatively, a compatible program may operate in a stand-alone mode on a user's computer, and may include the ability to download and/or upload transaction data from/to a central repository.

Thus, in some embodiments of the invention, information regarding users' financial transactions (e.g., purchases, investments) is electronically captured at a central computer server. Illustratively, this information may be received from merchants or other payees involved in the transactions, from organizations (e.g., credit card issuer, bank) that operate payment systems used to conduct the transactions, from the users, or from other entities.

Transactions may be categorized based on categories selected or identified by users and/or the central repository. For example, a user's categorization of past transactions may be used to identify categories considered active for that user. Within a community of users, the users' individual active categories may be merged in some fashion to identify categories active for that community.

Transactions may be tied to a given user based on his or her name, credit card number, another account number or other unique identifying information. Therefore, even when numerous transaction details are received from a credit card issuer, merchant or other entity, individual transactions can be associated with the correct user.

If collected automatically (e.g., via a user's credit card issuer or bank), transaction details may also be downloaded to the corresponding user's computer system. One skilled in the art will recognize how other embodiments of the invention may be configured to capture and process transaction information at a computer system operated by the user.

For each payee with which a user conducts transactions, the central computer or repository examines the user's past history of transactions. The history will reflect how the user's aggregated transactions with that payee can be split among some number of categories. For example, the history may reveal that, on average, the user spends $P_1$% of her transactions with the payee on food, $P_2$% on household goods, $P_3$% on entertainment, etc.

The historical pattern of transaction activity among the categories may be weighted to give more weight to more recent transactions, to transactions that were more accurately split, to categories in which the user has more activity, etc. The result may be adopted as an average or model "user-specific" transaction between the user and the payee to describe the user's interaction with that payee over time. When the user conducts a new transaction with the payee, the amount of the transaction may be automatically apportioned as specified in the model transaction.

When a user conducts a first transaction with a new payee, or until he or she conducts a threshold number of transactions with the payee (or a number of transactions having a total value that exceeds some threshold), the transaction may instead be split according to an average or model "community" transaction, which is developed in the same manner as a user-specific model transaction, but using data from a community of users (e.g., users of a given financial program, customers of a given payee, users sharing a common demographic).

A tentative split configured based on a model transaction, particularly a user-specific model transaction, may then be adjusted based on other users' transaction activity with the same payee or with related payees (e.g., payees offering the same types of goods or services). For example, the system may attempt to use transaction activity of "similar" users (e.g., users in the same community) to modify the tentative split.

After the tentative split is determined (and possibly adjusted with reference to average transactions for other payees and/or users), it is presented to the user and/or recorded in the user's financial software. The user may opt to correct the split to any degree, if desired. For example she may prefer to adjust the split to reflect the exact amounts spent in each category, re-categorize any part of the transaction, add or remove a category (and split the transaction among the resulting categories), etc.

If the user adjusts the tentative split, the manner in which the adjustment is made may or may not be used in future automatic splits. For example, if the user makes only a relatively minor correction to the tentative split, or indicates that this is an anomalous transaction (e.g., involves a purchase of one or more relatively expensive items) this may have no impact in the future. Or, the user may specifically request that his or her correction be used (or not be used) to adjust the manner in which automatic splits are made in the future.

FIG. 1 illustrates an environment in which an embodiment of the invention may be implemented. In this embodiment, central server 110 may be operated by a provider of financial software, such as Intuit, Inc., which provides software for accounting, budgeting, taxes and other purposes.

Central server 110 receives information regarding transactions conducted by users 130. The information may be received from the merchants, vendors or other entities (online or "brick and mortar" operations) with which the users conduct the transactions, although in other embodiments transaction information may be received from the users or other holders of transaction details (e.g., credit card issuers, banks).

In the illustrated embodiment, central server 110 stores transaction data 112, which may include information identifying the users and entities that engage in each transaction, transaction values, times, dates, locations, and so on. The central server may comprise a single computer, or may comprise multiple computers located local to or remote from each other.

Central server 110 may offer users 130 use of, or access to, online program 114 for recording transactions and/or other financial management purposes. Alternatively, users may operate local program 134 for the same or similar purpose(s). In either situation, central server 110 facilitates transaction splitting by storing and processing transaction data 112.

The central server may also store information for characterizing a merchant (or other entity). For example, merchants may be characterized according to the type or types of goods or services they provide.

Illustratively, and as described in U.S. patent application Ser. No. 11/833,206, entitled "Method and System for Automatic Recognition and Categorization of Transactions" and filed Aug. 2, 2007, the name of the payee of a transaction (e.g., a merchant, a brokerage), and/or other information associated with a transaction may be enough to categorize or tentatively categorize the transaction or a portion of the transaction. Application Ser. No. 11/833,206 is incorporated herein by reference.

In the embodiment of FIG. 1, analysis module 116 of central server 110 constructs user-specific and community model transactions 120, based on transaction data 112 and/or other information regarding a user and the entity or entities with which the user conducts transactions. Thus, for users of online program 114 and/or local program 134, the central server may track transaction activity between users and payees and configure model transactions accordingly. The model transactions may be reconfigured as additional transaction data are received.

When a new transaction is identified, transaction split module 118 applies a user-specific and/or community model transaction 120 to make an initial or tentative determination as to how to automatically split the transaction among multiple categories.

In some embodiments of the invention, analysis module 116 and/or transaction split module 118 are part of online program 114 (or local program 134). In other embodiments they are independent.

Figure 2B:
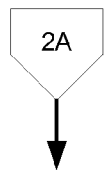

FIGS. 2A-B demonstrate data structures that may be used to configure model transactions in an illustrative embodiment of the invention. The illustrated data structures reflect user transactions with a single payee (e.g., a store that sells a wide variety of merchandise including clothing, groceries and household goods). From the discussion herein, it will be seen how the data structures may be extended to cover transactions with multiple payees.

User table 210 is designed to store data regarding users' individual transaction patterns with the payee. Community table 230 is designed to store data reflecting an aggregation of all the users' transactions with the payee. In one embodiment of the invention, however, some transactions may not be captured or reflected in the data structures, such as transactions that involve only a single category (i.e., are not split) or transactions that a user or other entity specifies as not being suitable for capture—such as one-of-a-kind transactions or anomalous transactions.

FIGS. 2A-B depict the tables as they evolve to reflect additional transactions. Thus, at each of time points T1 through T5, the data structures are shown as they have been amended for a recent transaction.

In the illustrated embodiment of the invention, user table 210 includes fields for identifying the user involved in one or more transactions with a payee, the transaction payee and the category or categories to which the user's transactions can be allocated. The table also includes a field configured to indicate, for each user and for each category in the user's transactions, the percentage or weight of the user's total transactions that can be allocated to that category. In this embodiment, the "split" field is configured to contain normalized values between 0 and 1(inclusive), but in other embodiments may contain dollar amounts, percentages or other values or data types.

In this embodiment, community table 230 includes fields for identifying the payee and each category within which transactions (and/or portions of transactions) have been conducted with the payee by all users in the community. The table also shows each category's portion of all transactions, that is, a percentage or weight reflecting the percentage of all transactions with the payee that can be allocated to each category.

As will be seen, after user table 210 is populated with data for a given user, new transactions for that user can be automatically split as indicated in the table. For users not yet represented in user table 210 (or not sufficiently represented), a transaction may be automatically split as indicated in community table 230.

The following description of an illustrative sequence of transactions will make it clearer how user table 210 and community table 230 represent model user-specific and community transactions, and how they can be used to automatically split a transaction. For purposes of illustration, each transaction is assumed to be for an equal value.

In the following sequence of transactions, time T1 represents the tables as they appear after a first transaction is recorded. In this transaction, user A engages in a transaction with Payee 1 that involves only a single category-Clothing. Note that categories may be selected or defined by the system (e.g., the central repository or server), and/or may be selected by a user. For example, the financial software executed by the user may offer pre-defined categories, and/or the user may add/remove categories to/from those offered by the software.

When this transaction is captured, a record is entered into user table 210 identifying the user, the payee, the category and the fact that the entire transaction can be allocated to the Clothing category. Community table 230 is updated with a first record reporting the payee, the category and a value representing the percentage or share of the transactions that fall within that category.

At time T2, the data structures are updated to reflect another transaction by user A. This transaction adds the category "Groceries" to user table 210 to reflect the user's new transaction pattern with Payee1—now 74% of the total value of his or her transactions with the payee is for clothing and 26% is for groceries. If the transaction had involved another new category (beyond Groceries), that category would also be reflected in the table.

Community table 230 at this time is very similar to user table 210 because only one user's activity has thus far been captured. In particular, at this time the "community" includes only user A; therefore the community's model transaction is identical to user A's user-specific model transaction.

In one alternative embodiment of the invention, the data structures at time T2 may represent how they appear after user A updated (e.g., manually split) the transaction recorded at time T1 (perhaps to correct how the transaction was initially recorded). This alternative interpretation shows that the data structures may automatically evolve not only as additional transactions are captured, but also as recorded transactions are corrected by users and/or other entities (e.g., a payee).

At time T3 one or more transactions by a new user, user B, are captured. Records in user table 210 that pertain to user A have not changed from time T2, which indicates that either no new transactions have been conducted between user A and Payee 1 or, alternatively, that any new transactions user A has conducted with Payee 1 have been split precisely as indicated in the table at time T2.

New entries in the user table at time T3 reveal that all of user B's transaction activity with the payee can also be categorized as either Clothing or Groceries, but with a different ratio from user A. In particular, 42% of user B's purchases fall into the Clothing category and 58% into Groceries.

Community table 230 at time T3 reflects the new distribution of value within transactions with Payee. More specifically, within the community of users (user A and user B), 56% of all purchases are for clothing and 44% for groceries.

After time T3, a new transaction involving Payee1 and either user A or user B will be automatically split according to the split values in user table 210. For other users, transactions with Payee 1 may be automatically split according to the percentages or proportions reflected in community table 230.

For example, if a user C were to now engage in a transaction with Payee1, that transaction would be automatically split so as to allocate 56% of its total value to the Clothing category and 44% to the Groceries category. User C may, of course, manually update the split (e.g., to make it more accurate). The tables may be updated after user C's action based on whether or not he or she adjusted the split. For example, if he or she simply accepted the automatic split based on community table 230, then the tables need not be modified (although user C may be added to user table 210 with records mirroring community table 230). But, if user C adjusted the automatic split, one or both tables may be updated to record the adjusted transaction distribution.

In an embodiment of the invention, some threshold number of transactions or some threshold total transaction value must be reflected in a table before it will be used for an automatic split.

At time T4, the tables are updated to reflect one or more transactions between user D and Payee 1. In these transactions, user D was observed to spend 19% of the total transaction value within the Clothing category and 81% within a Household category, and so two records are added to user table 210.

In addition, community table 230 is updated with a new record reflecting the new category, and the split values are updated accordingly. More specifically, 45% of all transactions by the community of users is allocable to Clothing, 28% to Groceries and 27% to Household.

Transactions by new users may now be automatically split among three categories instead of just two. Illustratively, however, if a new user has not defined or accepted a category (e.g., "Household"), either that category may now be defined for the user, or the user's transaction will be split among the other categories—with percentages updated to reflect removal of the undefined category.

The transaction recorded at time T5 demonstrates the ability to employ different model transactions in different circumstances. In particular, in this transaction, user E engages in a transaction with Payee1 that is categorized as "Rent" —for example, user E may lease an office or other space from the payee. Illustratively, the transaction may have been initially split as reflected in community table 230 at time T4 (assuming this is the first transaction for user E) and then corrected by user E (or Payee 1).

Although an entry is recorded in user table 210 at time T5 in the same manner as for other users, community table 230 is updated differently. Instead of merging user E's transaction with other recorded transactions and calculating corresponding percentages or weights for each category of transaction, user E's transaction is recognized as being unique from most users' transactions.

In one implementation, the amount of the transaction may be an indication that it is an atypical user transaction—the rent payment is likely to be greater in value than most users' transactions. In another implementation, the transaction category specified by the user or payee may mark it as unique. In yet other implementations, user E's identity may distinguish the transaction or user E or Payee1 may specify that the transaction should not be treated as a normal retail transaction.

In the illustrated embodiment of the invention, the distinguishing characteristic(s) of user E's transaction may be reflected in user table 210, community table 230 and/or a different data structure. For example, another field in community table 230 (not shown in FIGS. 2A-B) may be used to mark which entries or categories should or should not be used for "typical" user transactions.

Regardless of how it is marked or distinguished, the entry in community table 230 will be interpreted or applied differently from the other entries. The split value of "1" for this entry indicates that when another transaction matching this one's distinguishing characteristics is identified for a new user, it should be completely allocated to the Rent category. Of course when user E enters another transaction with Payee1 (e.g., the next rent payment), it will be automatically categorized as Rent based on user table 210 (not community table 230).

Figure 3:
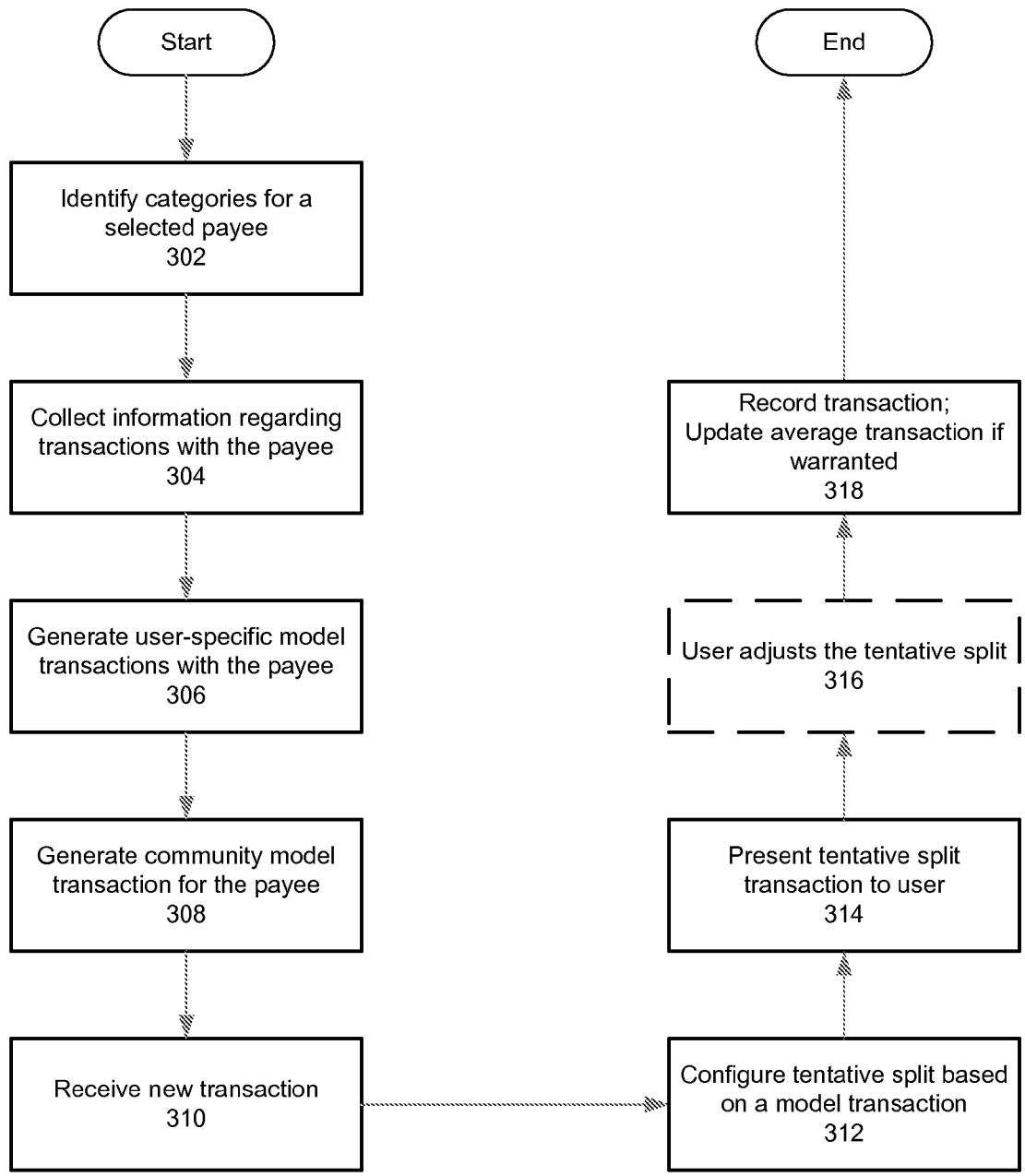
FIG. 3 is a flowchart illustrating one method of automatically splitting transactions, according to an embodiment of the invention.

FIG. 3 is a flowchart demonstrating a method of automatically splitting a transaction, according to one embodiment of the invention. In this embodiment, a central server maintains details of previous transactions involving users of a given financial management program and any number and type of payees (e.g., merchants, service providers, investment firms).

In operation 302, categories are identified for use in characterizing and splitting transactions with a given payee, with any desired degree of granularity. Thus, categories may be rather general, such as "clothing," "groceries," "entertainment," "travel," "household," etc. Alternatively, categories may be defined more narrowly, or sub-categories may be employed, such as "sporting events" and "movies" (instead of just "entertainment"), etc.

Operation 302 may be repeated for multiple payees. Further, in different embodiments of the invention, different categories may be defined for different users, different programs used to record the transactions, or the same categories may be applied to some or all users or programs.

In operation 304, the central server collects or assembles transaction information. This collection effort may span any number of users and payees, over any period of time, and include information from any number of transactions. The collection process may continue throughout the illustrated method. The transaction information may include various transaction details, such as who engaged in the transactions, the amounts involved, categories, when they occurred, what was purchased or paid for, etc.

The information that is collected is not limited to transactions with the payee analyzed in operation 302. In particular, transaction information may also be collected on similar or related payees—such as payees in the same line of business, payees that sell comparable goods or services, etc.

In one implementation, the central server's repository of transaction details is populated from users' past transactions recorded in the financial management program, and may be augmented with data from additional transactions as they occur. In another implementation, the central server may receive details of completed transactions from a credit card issuer, a bank or other organization.

In different embodiments of the invention, different users' transaction details may be retrieved and stored separately or may be processed together. For example, if a user's financial management program operates on the user's own computer, primary storage of the details may be on that computer (but may also be backed up or mirrored at the central server). Alternatively, for an online program, details of multiple users' transactions may be stored together.

In operations 306-308, the transaction information is processed to generate user-specific and community model transactions. In particular, the transaction data may be used to populate user and community tables such as those depicted in FIGS. 2A-B and described above.

In operation 306, a user table is generated for multiple users to reflect how each user's aggregated transactions can be or have been split with each payee. As shown in FIGS. 2A-B, the user table may comprise multiple records for each user and for each payee with which a user has transacted. The entries for a given user/payee combination reflect a model transaction and will be used to automatically split a new transaction between that user and payee.

In operation 308, a community table is generated to reflect how the multiple users' transactions with each payee, in the aggregate, are split among various categories. As shown in FIGS. 2A-B, the community table provides a community model transaction that can be applied to split a transaction between a payee and a new user (or a user that has not conducted a threshold number or value of transactions with the payee).

Thus, in operations 306-308, each user's past transactions are analyzed to determine an average apportionment of those transactions among the categories covered by those transactions. In addition, an average apportionment is determined for multiple users (or some subset of all users) for which meaningful transaction details with the payee are available.

When determining how to apportion a payee's historical transactions and configure a model transaction, the central server may examine how those transactions were split when originally stored in the financial management program. In particular, before a method of automatically splitting transactions as described herein was available, users that wished to accurately characterize their multi-category transactions needed to manually split them. This data may now be drawn upon to determine how a typical transaction with a given payee could be automatically categorized.

Because multiple users' experiences and any number of individual transactions can be used to generate the user-specific and community model transactions, relatively accurate views of each user's individual transaction pattern can be learned and an average user's transaction with the payee can be computed. Even if a community model transaction may not be completely accurate for every individual transaction between the payee and a new user, over time many users' transactions with the payee will likely conform to the averages.

In operation 310, a new transaction between a user and a payee is received at the central server. The transaction may be received from the user's payment provider (e.g., credit card issuer), the payee or even the user.

In operation 312, a tentative split of the transaction is calculated by applying a user-specific or community model transaction. If a user-specific model transaction exists (in a user table) for the user and payee, for each category included in the user-specific model transaction, that category's percentage of the model transaction is applied to the total value of the new transaction.

But, if the user is a new user to the system, or if no meaningful data for transactions between the user and the payee are available to calculate an average transaction, then the community model transaction for the payee is applied.

In an embodiment of the invention, multiple community model transactions may be developed for a given payee (and stored in the same or different community data tables) and applied in different situations. For example, community model transactions may be calculated to account for regional differences (e.g., people in different areas having different buying patterns, different store locations of the payee), seasonal fluctuations in buying patterns, demographic differences between users (e.g., age, sex, marital status, income), etc. Users may therefore be classified to assist in the selection of a suitable community model transaction to apply.

There may also be multiple user-specific and/or community model transactions to apply for different value thresholds. In other words, different model transactions may be applied depending on the overall amount of the transaction. For example, a relatively large amount may reflect the purchase of a big-ticket item in a category (e.g., electronic goods), in which case the transaction may depart from the norm.

In operation 314, the tentative multi-category split is presented to the user (e.g., via the financial management program). The split may be presented in real-time, or the next time the user accesses the program the tentative split transaction may be presented for the user to accept, modify, reject or take other action.

In optional operation 316, the user may adjust the split. Illustratively, the user may adjust any or all of the tentative categories' allocations, perhaps to more accurately reflect the actual transaction. In doing so, he may add or remove any of the tentative categories.

Also in operation 316, if the tentative split was adjusted by the user, he may specifically indicate whether this transaction should or should not be used to adjust his user-specific model transaction for the payee. For example, if the transaction was not typical of the user (e.g., he was buying things for someone else) he may specify that the transaction should be ignored for purposes of determining his typical transaction.

In operation 318, the transaction is recorded. In addition, any adjustments made to the tentative split may or may not be used to adjust the user-specific (and/or community) model transaction. As described immediately above, the user may specifically indicate whether his adjustment should be ignored.

If the user does not specify a preference as to whether his adjustments should be considered, the system may analyze how the tentative split was modified. For example, if the transaction was converted into a single-category transaction, then it may be ignored. Or, that category may receive increased or decreased weighting for purposes of recomputing a model transaction.

However, if the user took the time to adjust the tentative split to more accurately mirror the actual transaction, then the user-specific model transaction (and maybe one or more community model transactions) will benefit by being recomputed in light of the adjustment.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application-specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of automatically splitting a financial transaction into multiple categories, the method comprising:
    maintaining a record of multiple transactions conducted with a first payee by one or more users including a first user;
    identifying a plurality of categories for categorizing the multiple transactions;
    for each category in the plurality of categories, using a processor to determine a percentage of a total value of the first user's transactions with the first payee that is allocable to the category;
    using the processor to aggregate the plurality of categories and each category's percentage to form a first user-specific model transaction;
    storing the first user-specific model transaction on a computer readable data storage device;
    identifying a new transaction conducted by the first user with the first payee;
    automatically splitting the new transaction based on the first user-specific model transaction; and
    electronically displaying the automatically split transaction for the user.

2. The method of claim 1, further comprising:
    receiving from the first user a correction to the automatically split transaction.

3. The method of claim 2, further comprising:
    adjusting the first user-specific model transaction based on the correction.

4. A computer-readable medium storing instructions that, when executed by a computer, cause the computer to perform a method of automatically splitting a financial transaction into multiple categories, the method comprising:
    maintaining a record of multiple transactions conducted with a first payee by one or more users including a first user;
    identifying a plurality of categories for categorizing the multiple transactions;
    for each category in the plurality of categories, automatically determining a percentage of a total value of the first user's transactions with the first payee that is allocable to the category;
    aggregating the plurality of categories and each category's percentage to form a user-specific model transaction;
    storing the first user-specific model transaction on a computer readable data storage device;
    identifying a new transaction conducted by the first user with the first payee;
    automatically splitting the new transaction based on the first user-specific model transaction; and
    electronically displaying the automatically split transaction for the user.

5. The method of claim 1, further comprising:
    updating the first user-specific model transaction based on one or more additional transactions of the first user with the first payee.

6. The method of claim 1, wherein a percentage of a total value of a user's transactions with a given payee that is allocable to a particular category comprises a portion of the total value that was paid for a purpose related to the particular category.

7. A method of automatically splitting a financial transaction into multiple categories, the method comprising:
    maintaining a record of multiple transactions conducted with a first payee by one or more users including a first user;
    identifying a plurality of categories for categorizing the multiple transactions;
    for each category in the plurality of categories, using a processor to determine a percentage of a total value of the multiple transactions that is allocable to the category, wherein the multiple transactions are conducted by multiple users;
    using the processor to aggregate the plurality of categories and each category's percentage to form a first community model transaction;
    storing the first community model transaction on a computer readable data storage device;
    identifying a new transaction conducted by the first user with the first payee;
    automatically splitting the new transaction based on the first community model transaction; and
    electronically displaying the automatically split transaction for the user.

8. The method of claim 7, further comprising:
    receiving from the first user a correction to the automatically split transaction.

9. The method of claim 8, further comprising:
    adjusting the first community model transaction based on the correction.

10. The method of claim 7, further comprising:
    updating the first community model transaction based on one or more additional transactions of the first user with the first payee.

11. The method of claim 7, further comprising:
    updating the first community model transaction based on one or more additional transactions with the first payee by users other than the first user.

12. The method of claim 7, wherein a percentage of a total value of multiple transactions with a given payee that is allocable to a particular category comprises a portion of the total value that was paid for a purpose related to the particular category.

* * * * *